Figure 1:
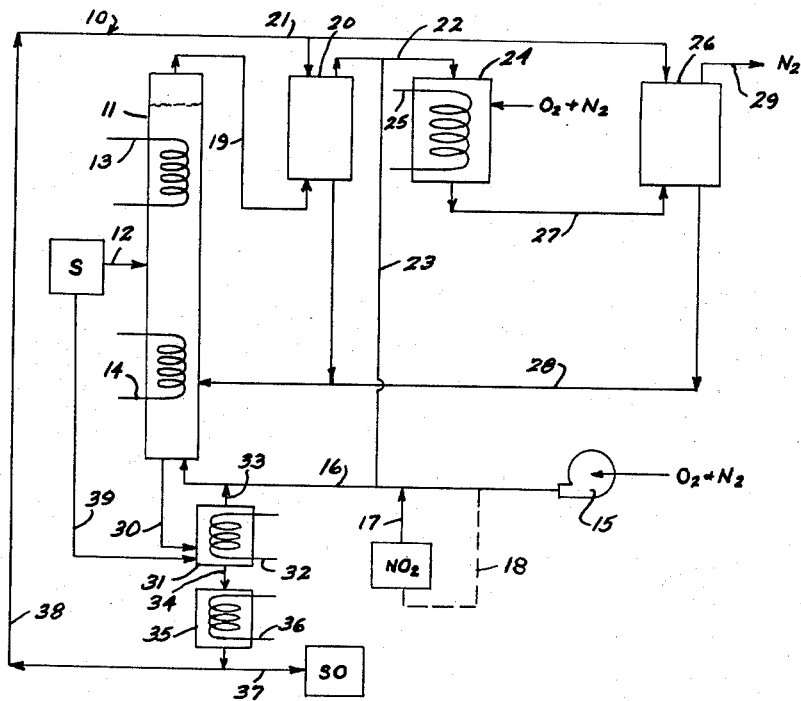

Inventor
WILLIAM F. TOMLINSON

United States Patent Office 2,938,927
Patented May 31, 1960

2,938,927
GAS RECOVERY

William F. Tomlinson, Clarendon Hills, Ill., assignor, by mesne assignments, to The Stepan Chemical Company, Chicago, Ill., a corporation of Delaware Filed Mar. 27, 1956, Ser. No. 574,209

4 Claims. (Cl. 260—607)

This invention relates to a method for the manufacture of sulfoxides, and more particularly, to an improved process for the manufacture of low molecular weight sulfoxides from the corresponding sulfides.

United States Letters Patent No. 2,581,050 relates to the vapor phase oxidation of dimethyl sulfide to dimethyl sulfoxide using an oxygen-containing gas which also includes a small amount of an oxygen-transmitting nitrogen oxide (such as nitrogen dioxide), using reaction temperatures sufficient to maintain the dimethyl sulfide in the vapor phase.

United States Letters Patent No. 2,702,824 relates to the liquid phase oxidation of low molecular dialkyl sulfides to the corresponding sulfoxides by bubbling a gaseous mixture through the liquid dialkyl sulfide at a reduced temperature to maintain the dialkyl sulfide in the liquid phase. The gaseous mixture bubbled through the liquid dialkyl sulfide comprises an oxygen-containing gas such as air and a small amount of an oxygen-transmitting nitrogen oxide such as $NO_2$.

In each of the foregoing operations, the temperature control is critical, in order to maintain the desired liquid or vapor phase for the reaction, and the catalyst concentration in the oxygen-containing gas must be carefully controlled. Moreover, the most practical oxygen-containing gas is air which also contains substantial quantities of nitrogen. In each of the above described processes, at the end of the process, a substantial quantity of spent gas must be separated from the predominantly sulfoxide reaction product. In the above described vapor phase operation, the operating temperature is ordinarily above the boiling point of the sulfide and such spent gases will contain certain quantities of the sulfide. In the liquid phase process above described, gases bubbling through the liquid phase will tend to carry off substantial quantities of the sulfide (which has a relatively high vapor pressure), even though the body of the sulfide is maintained in the liquid phase. Also, substantial quantities of NO will be present in the spent gases. If air is used as the main oxidizing agent, the spent gases will also contain a very substantial quantity of nitrogen.

Heretofore, temperature control was ordinarily employed in an effort to condense out as much as possible the sulfide escaping with the gases. The instant invention is based upon the discovery that sulfide losses in the spent gases can be substantially eliminated by scrubbing the spent gases with the sulfoxide, which may be the sulfoxide obtained in the reaction so that the sulfoxide which has scrubbed the spent gases may be returned to the original reaction zone.

It will also be appreciated that by the use of air as the main oxidizing gas a continual buildup of nitrogen in the system is accomplished and such nitrogen must be purged from the system, as spent gas. By withdrawing such nitrogen from the system as spent gas, even if the sulfide has been condensed or scrubbed out of the spent gas, losses of NO will also be incurred. Scrubbing of the spent gas with the sulfoxide will not remove NO from the spent gas to any appreciable extent. The instant invention provides for oxidizing the spent gas so as to oxidize the NO therein to $NO_2$. This is then followed by scrubbing with the sulfoxide, which has been found to readily remove the $NO_2$ from the spent gas. Throughout the instant specification $NO_2$ is used, although it will be appreciated that such $NO_2$ may exist as such or it may exist as the polymer $N_2O_4$, both of which function in the same manner herein and are thus referred to merely as $NO_2$ in the instant specification.

It is, therefore, an important object of the instant invention to provide an improved method for oxidizing low molecular weight sulfides to the corresponding sulfoxides.

It is a further object of the instant invention to provide an improved method for the manufacture of low molecular weight sulfoxides from the corresponding sulfides by a process which is made industrially practical by a subsequent scrubbing step which involves scrubbing the spent gases from the reaction with the sulfoxide in order to recover valuable components from the spent gases.

Other objects, features and advantages of the present invention will become apparent to those skilled in the art from the following detailed disclosure thereof and drawings attached hereto and made a part hereof.

Figure 2:
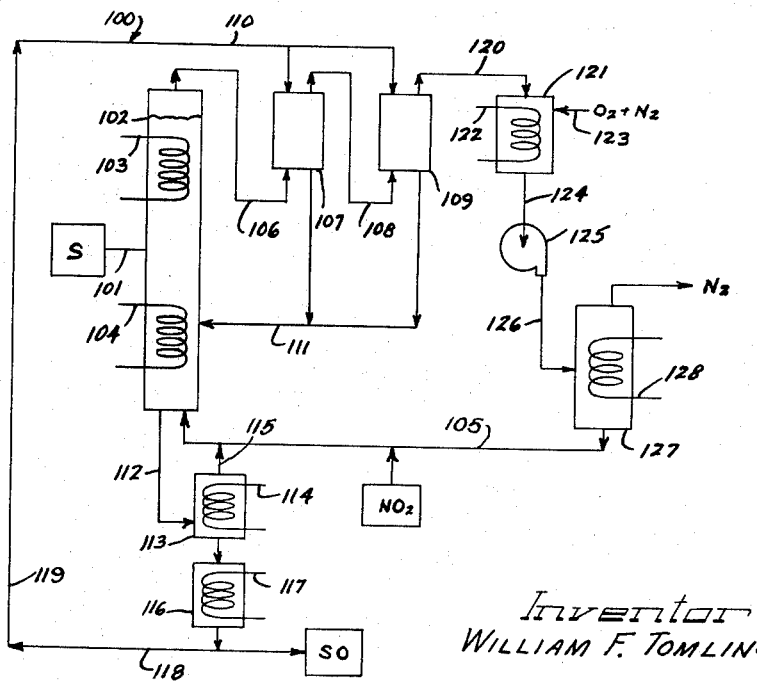

On the drawings:

Figure 1 is a flow sheet showing one arrangement for carrying out the method of the instant invention; and Figure 2 is a flow sheet showing another arrangement for carrying out the method of the instant invention.

As shown on the drawings:

In the assembly generally indicated by the reference numeral 10 in Figure 1, there is provided a reaction column 11 which may be provided with a filling material or may be without the filling material packed therein to prevent channelling of upwardly flowing spent gases. The sulfide from a suitable sulfide storage tank S flows into the middle of the column through a line 12. Heating or cooling coils 13 and 14 are provided above and below the sulfide inlet 12 in the column 11 for temperature control purposes. An oxidizing gas such as air ($O_2+N_2$) is drawn in through the intake of a blower or compressor 15 and fed into an inlet header 16 which leads directly into the bottom of the column 11. An oxygen-transmitting nitrogen oxide, such as $NO_2$, is fed from a suitable storage tank into the inlet header 16 through a line 17. If desired, air may be blown through the nitrogen oxide storage container through line 18 (shown as a broken line) and then out through the line 17 into the header 16.

The reactions presumably taking place within the column 11 may be represented by the following equations:

(1) 

(2) 

wherein $>S$ is the sulfide S atom and $>S=O$ is the sulfoxide grouping. It will be noted that actual oxidation of the sulfide to the sulfoxide is believed to be caused by reaction between the sulfide S atom and $NO_2$; but the resulting NO is constantly being regenerated to $NO_2$ by the presence of the oxygen from the air. As will be appreciated, only a small amount of the oxygen-transmitting nitrogen oxide, such as about 10 to 15% by volume is employed, according to said U.S. Patent No. 2,702,824, and the bulk of the oxidizing gas is oxygen from the air, which is added in an amount just sufficient to complete the oxidation of the sulfide, according to said patent. In other words, for each mol of sulfide one-half mol of oxygen is employed (usually with the two mols of nitrogen present in the air with this amount of oxygen). The resulting spent gas which escapes from the top of the body of liquid in the column 11 contains a substantial quantity of nitrogen and a relatively smaller quantity of NO, plus sulfide and sulfoxide vapor. The spent gas is essentially a non-oxidizing gas, and it has been found that the amount of sulfoxide vapor therein is extremely minute because of the low vapor pressure of sulfoxide, but substantial quantities of sulfide are present in the spent gas. The spent gas is separated from the reaction mixture in the column 11 and withdrawn from the top of the column 11 through a conduit 19 into the bottom of a scrubber 20, which is preferably filled with a filler material to give maximum surface area within the scrubber 20 for liquid-gas contact. Sulfoxide is fed into the top of the scrubber 20 from a header 21 and the sulfoxide removes substantially all of the sulfide from the spent gas in the scrubber 20. More than one scrubber may, of course, be used in series in order to completely remove all of the sulfide. The unique advantage of using the instant sulfoxide to remove the sulfide is that the sulfoxide has very great selective solvency for the sulfide and it also has extremely low vapor pressure at the ordinary operating temperatures (of about room temperature) so that a negligible amount of sulfoxide will be carried out of the top of the scrubber 20 in the spent gas conduit 22. A recycle line 23 may be used, if desired, to return a predetermined portion of the spent gas to the inlet header 16 to be recycled back through the column 11. In this manner, some of the escaping NO in the spent gas is returned to the system.

It will be appreciated that, if substantially pure oxygen were fed into the system at the compressor 15 (rather than air) then most of this oxygen, if not all of it, would be consumed in the column 11 and the spent gases would consist primarily of NO, plus the sulfide. Under such circumstances, substantially all of the spent gases would be recycled through the recycle line 23 back into the incoming header 16 to be admixed with fresh oxygen. Because of the relatively high cost of substantially pure oxygen, however, it is ordinarily not practical to use pure oxygen and air is used. When air is used, it will be appreciated that nitrogen will build up in the system and all of the spent gas cannot be recycled back through the recycle line 23. Instead, an appreciable quantity of the spent gas must be released to the atmosphere to prevent the buildup of nitrogen in the gas cycle. In the instant arrangement 10, the spent gas to be purged is fed into a reactor 24 where it is admixed with a small amount of air, ordinarily just enough to completely oxidize the relatively small proportion of NO contained in the spent gas. The NO is oxidized to $NO_2$ in the reactor 24. The reactor 24 is equipped with adequate cooling coils 25 to provide the desired temperature for carrying out the oxidation reaction therein, so that the NO in the spent gas will be substantially completely converted to $NO_2$. The "oxidized" spent gas is then passed out of the reactor 24 and into the bottom of another scrubber 26 through the line 27. Sulfoxide is fed into the top of the scrubber 26 (which may be designed substantially the same as the scrubber 20 for maximum liquid-gas contact) and the sulfoxide removes substantially all of the $NO_2$ from the "oxidized" spent gas mixture of $NO_2$ and nitrogen, plus a slight excess of oxygen, and the sulfoxide passes out of the bottom of the scrubber 26 and into the return sulfoxide header 28 which also receives sulfoxide from the bottom of the scrubber 20 and returns the sulfoxide from both scrubbers 20 and 26 into the column 11 preferably between the main sulfide inlet 12 and the bottom of the column. Nitrogen passes out of the top of the scrubber 26 through the purge outlet 29 to the atmosphere.

The arrangement 10 of Figure 1 is shown for use with a continuous process wherein the crude sulfoxide product is continuously withdrawn through a product line 30 leading from the bottom of the column 11. It will be appreciated, however, that the previously described features of the arrangement 10 may also be used with a batch process, wherein a batch reactor is used in place of the column 11 and gas is continuously passed through an inlet header 16 into the bottom of the kettle until substantially all of the sulfide in the reactor has been converted to sulfoxide. The recovery of sulfide from the spent gas in the scrubber 20 can be operated continuously during such batch operation and so also can the recovery of $NO_2$ from the spent gases in the scrubber 26; but this requires the use of a somewhat larger batch reactor and it is preferable to store the sulfoxide collected in the return header 28 for use in the next batch.

In the continuous arrangement 10 here shown, however, the sulfoxide is withdrawn from the bottom of the column 11 through the product line 30 and into a first holding tank 31 equipped with temperature control coils 32, where the sulfoxide product is warmed slightly. Actually, the sulfoxide being withdrawn through the product line 30 contains a certain amount of dissolved $NO_2$. The $NO_2$ is readily soluble in the sulfoxide, whereas the NO is not readily soluble therein. The sulfoxide may be separated from the dissolved $NO_2$ in either of two ways. One way involves merely heating the sulfoxide in the first holding tank 31 using the heating coil 32 so as to drive out substantially all of the dissolved $NO_2$ which returns to the main inlet header 16 through the line 33 at the top of the holding tank 31. The sulfoxide is then withdrawn from the bottom of the first holding tank 31 through a line 34 into a second holding tank 35 also equipped with temperature control coils 36. In the second holding tank 35 the sulfoxide is cooled down to storage or room temperature and from there it is fed into product storage SO through the line 37. As previously mentioned, it is preferable to employ the sulfoxide produced in the instant reaction in the scrubbers 20 and 26 and a recycle line 38 recycles the sulfoxide, or a portion of the sulfoxide here produced, back to the sulfoxide header 21 for the scrubbers 20 and 26.

Another way of separating the sulfoxide from dissolved $NO_2$ which has been found to be practical is to add sulfide from the sulfide storage S into the first holding tank 31 in a small amount sufficient to react with all of the $NO_2$ dissolved in the sulfoxide. Preferably, a slight excess of sulfide is fed through the line 39 from the storage tank S into the holding tank 31 and heating in the tank 31 serves to remove any unoxidized sulfide as well as the NO to which all of the dissolved $NO_2$ has been converted.

Referring now to Figure 2 which shows a somewhat different arrangement indicated generally by the reference numeral 100, it will be noted that the arrangement 100 is made for a process wherein the incoming oxidizing gas consists essentially of $NO_2$. This permits a substantially closed cycle which will be described. In the arrangement of Figure 2, sulfide from the sulfide storage S is fed through a line 101 into the middle of a reaction column 102 which is equipped with suitable temperature control coils 103 and 104 above and below the sulfide inlet line 101. A gas consisting essentially of $NO_2$ is fed into the bottom of the column through the gas inlet header 105. In the reaction column 102 the $NO_2$ is converted substantially completely to NO and the spent gas coming off the top of the body of liquid in the reaction column 102 consists mainly of NO plus sulfide and sulfoxide vapor. As previously mentioned, the low vapor pressure of the sulfoxide at reaction temperatures causes only a negligible amount of sulfoxide to be carried over with the NO, but an appreciable amount of sulfide is carried over with the NO in the non-oxidizing spent gas. The spent gas is passed through a first conduit 106 and into the bottom of a first scrubber 107, then out the top of the first scrubber 107 into the second conduit 108 and then through the bottom of a second scrubber 109. The scrubbers 107 and 109 are connected in series in order to obtain more complete scrubbing of the NO. Sulfoxide is fed from the sulfoxide header 110 into the tops of both of the scrubbers 107 and 109 and flows from the bottom thereof into a return sulfoxide header 111 which enters the reaction column 102 preferably below the sulfide inlet 101 and above the bottom of the column 102.

The sulfoxide product takeoff arrangement may be substantially the same as that described in connection with Figure 1. The crude sulfoxide product is withdrawn from the column 102 through the product line 112 and into a first holding tank 113 equipped with suitable temperature control coils 114, wherein the sulfoxide is separated from dissolved $NO_2$ and/or sulfide; and NO, $NO_2$ and/or sulfide are returned to the inlet gas header 105 through the line 115. The sulfoxide is then withdrawn from the bottom of the first holding tank 113 and cooled in the second holding tank 116 with suitable temperature control coils 117 from which it is passed into the product header 118 which feeds some sulfoxide to the sulfoxide storage SO and recycles some sulfoxide through a line 119 to the sulfoxide header 110 for the scrubbers 107 and 109.

As indicated, $NO_2$ from the $NO_2$ storage can be fed into the incoming gas header 105 and this results in the production of NO which ultimately passes out the top of the second scrubber 109 into a spent gas header 120 from which the NO is fed into a reactor 121 equipped with suitable temperature control means 122. Oxygen or preferably air is fed into the reactor 121 through an inlet line 123 in an amount sufficient to convert the NO to $NO_2$ in the reactor 121. This results in a gas mixture of $NO_2$ plus a substantial quantity of nitrogen (if air is used) and perhaps a slight excess of oxygen which is withdrawn through the line 124 from the reactor 121 and fed into the suction of a compressor 125, which compressor 125 functions not only as the gas pump for effecting continuous flow of gas in the gas cycle in the system, but which preferably compresses the gas to super atmospheric pressure so as to assist in condensing out $NO_2$ from the remainder of the gas. The compressed gas is fed through the line 126 into a condensing chamber 127 equipped with suitable cooling coils 128 wherein the temperature is maintained sufficiently low to effect substantially complete condensation of the $NO_2$ in the gas. The condensing chamber 127 does not require much more than a rather extensive cooling surface, because of the very great difference between the boiling points of $NO_2$ and nitrogen or oxygen which may also be present. The condensed $NO_2$ is then drawn out of the bottom of the condenser 127 into the main gas inlet 105 to be recycled back into the column 102. Makeup $NO_2$ may be added to the inlet 105 to take care of any losses which may occur, but the instant arrangement is extremely effective in minimizing losses because of the sequence in which the various process steps are carried out.

It will also be appreciated that the arrangement 100 can be modified for a batch process in the manner described in connection with the arrangement 10.

It will also be appreciated that either the arrangement 10 or the arrangement 100 can be modified so as to be used in a vapor phase oxidation of the sulfide, merely by replacing the column 11 or 102 with a series of gas phase reactors which afford intimate contact between the oxidizing gas and the sulfide at controlled temperatures and which afford means for drawing off sulfoxide product which will condense out at the reaction temperatures. In such cases the return headers 28 and 111 would feed to the crude condensed sulfoxide product. The condensed sulfoxide product will, of course, contain $NO_2$ and the admixture of sulfoxide containing dissolved sulfide from the scrubbers would result in additional reaction, so that the reaction mixture here involved would include not only the gas phase but the liquid condensate phase.

In the practice of the instant invention any of the lower molecular weight sulfoxides may be produced. Preferably such sulfoxides are liquids at room temperature. The corresponding sulfides are preferably fluids (i.e. gas or liquid) at room temperature and should be fluids at temperatures at least as low as about 10° C., or lower if it is desired to carry out the reaction at a lower temperature.

The sulfides which may be used in the practice of the instant invention include the low molecular weight dialkyl sulfides having the following formula:

wherein each R is the same or a different $C_1$—$C_4$ alkyl group. Such dialkyl sulfides include dimethyl sulfide, methyl ethyl sulfide, methyl propyl sulfide, methyl isopropyl sulfide, methyl n-butyl sulfide, methyl secondary butyl sulfide, etc.; diethyl sulfide, ethyl propyl sulfide, etc.; dipropyl sulfide, etc.; and dibutyl sulfide, etc.

The sulfides may also be heterocyclic compounds where S is a nuclear atom. Such compounds include 5 to 6 membered rings having 1 to 2 nuclear S atoms and the remainder C atoms, in saturated or unsaturated rings, with 1 to 2 substituents on the C atoms, preferably $C_1$—$C_4$ alkyl substituents. Typical types of compounds are based on the thiophene and tetramethylene sulfide nuclei:

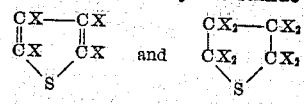

wherein each X is H or a $C_1$—$C_4$ alkyl group but not more than 2 X's are alkyl groups and the remainder are H's. Examples include thiophene, tetramethylene sulfide, 1-methyl tetramethylene sulfide, 2-methyl tetramethylene sulfide, 1,3-dimethyl tetramethylene sulfide, etc. up to 1-butyl tetramethylene sulfide.

Another heterocyclic compound is based on a 6 membered ring nucleus:

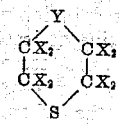

wherein Y may be S or $CX_2$ and the X's have the meaning hereinbefore given. Examples include pentamethylene sulfide, 1-methyl pentamethylene sulfide, 2-methyl pentamethylene sulfide, 3-methyl pentamethylene sulfide, 1,2-dimethyl pentamethylene sulfide, etc. up to the butyl pentamethylene sulfides; and dithiane (i.e. diethylene disulfide), 1-methyl dithiane, etc. up to the butyl dithianes. Members of these groups which are normally solids can be dissolved in, for example, dimethyl sulfoxide to provide a liquid composition of the sulfide that is oxidized in the process of the invention.

In the practice of the invention, the organic sulfide may be oxidized in either the liquid or the vapor phase, but in the case of the higher boiling sulfides it is ordinarily preferable to employ liquid phase oxidation at lower readily controllable temperatures rather than at higher temperatures required to volatilize the sulfide. In general, sulfides boiling at temperatures above about 75° C. should preferably be oxidized in the liquid phase rather than the vapor phase; and sulfides which are solids at temperatures above about 75° C. should be oxidized in the liquid phase in solution in a sulfoxide such as dimethyl sulfoxide (or any other solvent which is not reactive with the ingredients here present, namely, the sulfide, sulfoxide, NO and $NO_2$). Preferably, the aforementioned temperature of 75° C. should be about 40° C., since this is a preferred maximum temperature for carrying out the instant oxidizing reaction. The minimum temperature at which appreciable oxidation takes place is around 10° C. The preferred reaction temperature range is about 25–40° C.

The reaction conditions set forth in said United States Letters Patent No. 2,581,050 and No. 2,702,824 may be used in the practice of the instant invention. In addition, a reaction involving only the sulfide and $NO_2$ may be used, as described generally in connection with Figure 2. In carrying out such reaction the initial step is that of contacting the sulfide with at least a molar equivalent of $NO_2$ in the substantial absence of other gases or oxidizing agents, in other words, at least a molar equivalent of a gas consisting essentially of $NO_2$. Since absolute purity of $NO_2$ is not a requirement for the successful operation of the instant invention, it will be appreciated that perhaps 10 to 15% (by volume) impurities in the $NO_2$ gas can be tolerated, in the form of NO, $O_2$, $N_2$, etc. The amount of the $NO_2$ introduced into the system in the sulfoxide which is withdrawn from the reaction zone. For 2 molar equivalents of the sulfide. In the liquid phase reaction there is a tendency for the sulfoxide reaction product to dissolve $NO_2$ and thus retain an appreciable amount of the $NO_2$ introduced into the system in the sulfoxide which is withdrawn from the reaction zone. For this reason, it is desirable to add a sufficient excess of $NO_2$ to the reaction zone to permit the loss in $NO_2$ resulting from the withdrawal of the sulfoxide from the reaction zone and also to permit complete oxidation of the sulfide added to the reaction zone. If the $NO_2$ is removed from the sulfoxide reaction product by addition of sulfide thereto, NO will be produced and in the arrangement shown in the drawings the NO will be added directly to the incoming $NO_2$ stream so that the amount of NO in the $NO_2$ stream may sometimes be slightly greater than 10 to 15% by volume. On the other hand, if the dissolved $NO_2$ is removed from the crude sulfoxide product by moderate heating, the $NO_2$ will merely supplement the incoming gas stream; and in either event there is no material loss of nitrogen oxides.

It will thus be seen that the instant invention consists in a process for the manufacture of a low molecular weight sulfoxide from the corresponding sulfide by oxidation thereof, which comprises admixing the sulfide with an oxidizing atmosphere containing an amount of oxygen transmitting nitrogen oxide at least sufficient to catalyze the oxidation reaction to produce a reaction mixture containing the sulfoxide and a non-oxidizing spent gas, separating sulfoxide from the other ingredients in the reaction mixture, separating the spent gas from the reaction mixture, and scrubbing the spent gas with sulfoxide and returning such sulfoxide to the reaction mixture.

As a specific demonstration, in the unit 10 of Figure 1, the oxidation reaction is carried out in the reactor 11 and the line 19 carries off spent gas having the composition: 10% dimethyl sulfide, 10% NO and remainder essentially $N_2$. (All percents are by volume.) The spent gas in the line 19 is scrubbed by 0.2 of its volume of dimethyl sulfoxide in the scrubber 20 and the resulting gas in the line 22 has the composition: 10% NO, 0.5% dimethyl sulfide and remainder essentially $N_2$. The gas in the line 22 is exposed to an equal volume of air to oxidize the NO to $NO_2$ in the reactor 24 and then scrubbed in the scrubber 26 with 0.2 of its volume of dimethyl sulfoxide and the resulting gas composition is 0% dimethyl sulfide, traces of nitrogen oxide and remainder $N_2$ and $O_2$.

In the unit 100 of Figure 2, the oxidation reaction is carried out in the reactor 102, using essentially 100% $NO_2$ and the resulting spent gas in the line 106 has the composition: 5% dimethyl sulfide and remainder essentially NO. The gas in the line 106 is scrubbed with 0.2 its volume of dimethyl sulfoxide in the scrubber 107 and the resulting gas contains only about 0.5% dimethyl sulfide, remainder NO, in the line 108. A second scrubbing in the scrubber 109 reduces the dimethyl sulfide to trace amounts (in the line 120); and oxidation by 6 times its volume of air in the reactor 121 converts the NO to $NO_2$ which is removed (all except trace amounts) from the resulting $N_2$ and $O_2$ by compressing to 100 p.s.i. in the pump 125 and cooling to 20° F. in the cooler 127 to liquefy the $NO_2$.

It will be understood that modifications and variations may be effected without departing from the scope of the novel concepts of the present invention.

I claim as my invention:

1. A process for the manufacture of a di-lower alkyl sulfoxide from the corresponding sulfide by oxidation thereof, which comprises admixing the sulfide with an oxidizing atmosphere containing an amount of oxygen transmitting nitrogen oxide at least sufficient to catalyze the oxidation reaction to produce a reaction mixture containing the sulfoxide and a non-oxidizing spent gas comprising NO plus sulfide and sulfoxide vapor, separating sulfoxide from the other ingredients in the reaction mixture, separating the spent gas from the reaction mixture, oxidizing the NO in the spent gas to $NO_2$, and scrubbing the spent gas with sulfoxide and returning such sulfoxide to the reaction mixture.

2. A process for the manufacture of a di-lower alkyl sulfoxide from the corresponding sulfide by oxidation thereof, which comprises admixing the sulfide with an oxidizing atmosphere containing an amount of oxygen transmitting nitrogen oxide at least sufficient to catalyze the oxidation reaction to produce a reaction mixture containing the sulfoxide and a non-oxidizing spent gas comprising NO plus sulfide and sulfoxide vapor, separating sulfoxide from the other ingredients in the reaction mixture, separating the spent gas from the reaction mixture, scrubbing the spent gas with sulfoxide and returning such sulfoxide to the reaction mixture, oxidizing the NO in the spent gas to $NO_2$, and then removing the $NO_2$ from the remainder of the spent gas and returning the $NO_2$ to the reaction mixture.

3. A process for the manufacture of a di-lower alkyl sulfoxide from the corresponding sulfide by oxidation thereof, which comprises admixing the sulfide with an oxidizing atmosphere containing an amount of oxygen transmitting nitrogen oxide at least sufficient to catalyze the oxidation reaction to produce a reaction mixture containing the sulfoxide and a non-oxidizing spent gas comprising NO plus sulfide and sulfoxide vapor, separating sulfoxide from the other ingredients in the reaction mixture, separating the spent gas from the reaction mixture, scrubbing the spent gas with sulfoxide and returning such sulfoxide to the reaction mixture, oxidizing the NO in the spent gas to $NO_2$, and then scrubbing such oxidized spent gas with sulfoxide to remove the $NO_2$ and return the $NO_2$ to the reaction mixture.

4. A process for the manufacture of a di-lower alkyl sulfoxide from the corresponding sulfide by oxidation thereof, which comprises admixing the sulfide with $NO_2$ in an amount sufficient to oxidize all of the sulfide to sulfoxide to produce a reaction mixture containing the sulfoxide and a non-oxidizing spent gas comprising NO plus sulfide and sulfoxide vapor, separating sulfoxide from the other ingredients in the reaction mixture, separating the spent gas from the reaction mixture, scrubbing the spent gas with sulfoxide and returning such sulfoxide to the reaction mixture, oxidizing the NO in the spent gas to $NO_2$, and then removing the $NO_2$ from the remainder of the spent gas and returning the $NO_2$ to the reaction mixture.

References Cited in the file of this patent

UNITED STATES PATENTS 2,581,050    Smedslund              Jan. 1, 1952